United States Patent [19]

Baxendale

[11] 3,980,159

[45] Sept. 14, 1976

[54] CAM ACTUATED DISC BRAKE ASSEMBLY

[75] Inventor: Charles L. Baxendale, Burleson, Tex.

[73] Assignee: Mechanics, Inc., Fort Worth, Tex.

[22] Filed: Dec. 19, 1974

[21] Appl. No.: 534,170

[52] U.S. Cl. ............................ 188/72.7; 188/18 A; 188/71.7; 188/73.2; 188/196 V
[51] Int. Cl.² ........................................ F16D 55/16
[58] Field of Search ............... 188/71.4, 71.7, 72.1, 188/72.5, 72.7, 72.8, 72.9, 73.2, 73.3, 18 A, 196 V

[56] References Cited
UNITED STATES PATENTS

| 1,849,584 | 3/1932  | Milan         | 188/72.8 |
| 1,998,660 | 4/1935  | Dodge         | 188/72.8 |
| 2,320,286 | 5/1943  | Lambert       | 188/71.7 |
| 2,368,417 | 1/1945  | Lambert       | 188/71.7 |
| 2,526,143 | 10/1950 | Lambert       | 188/72.7 |
| 2,772,596 | 12/1956 | Trussell      | 188/196 V |
| 2,938,607 | 5/1960  | Kershmer et al. | 188/72.8 |
| 3,559,772 | 2/1971  | Grombka       | 188/196 V |
| 3,802,539 | 4/1974  | Thiele        | 188/72.9 |
| 3,830,343 | 8/1974  | Gardner       | 188/72.7 |

FOREIGN PATENTS OR APPLICATIONS

| 438,968 | 12/1967 | Switzerland | 188/18 A |
| 957,504 | 5/1964 | United Kingdom | 188/73.2 |
| 183,405 | 7/1922 | United Kingdom | 188/72.8 |

*Primary Examiner*—Duane A. Reger
*Assistant Examiner*—Edward R. Kazenske
*Attorney, Agent, or Firm*—Wofford, Felsman, Fails & Zobal

[57] ABSTRACT

A disc brake assembly for a vehicle comprising an annular disc and a flange adapter for coupling the disc to the wheel of the vehicle for rotation with the wheel around the axle and for supporting the disc for axial movement. Two housing members are located on opposite sides of the disc and connected together and to the axle. A stationary brake shoe with a lining is located between one housing member and the disc and a further brake shoe with a lining is located between the disc and the other housing member and supported for axial movement. A camming arrangement is actuated by a pneumatic system for actuating the disc brake assembly for braking purposes. Removable shims are provided for spacing the two housing members apart and which may be removed for adjustment purposes as the brake lining wears.

3 Claims, 13 Drawing Figures

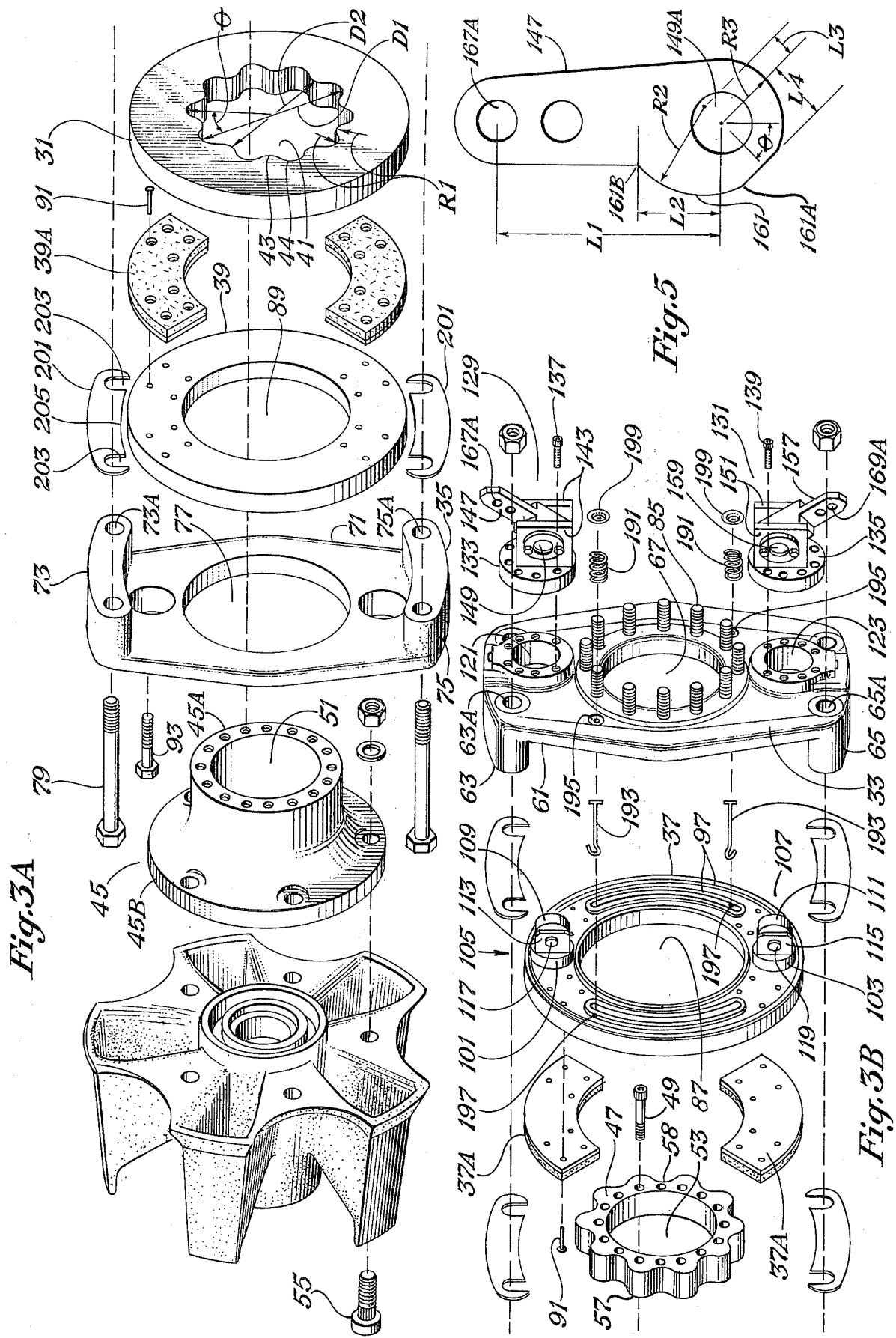

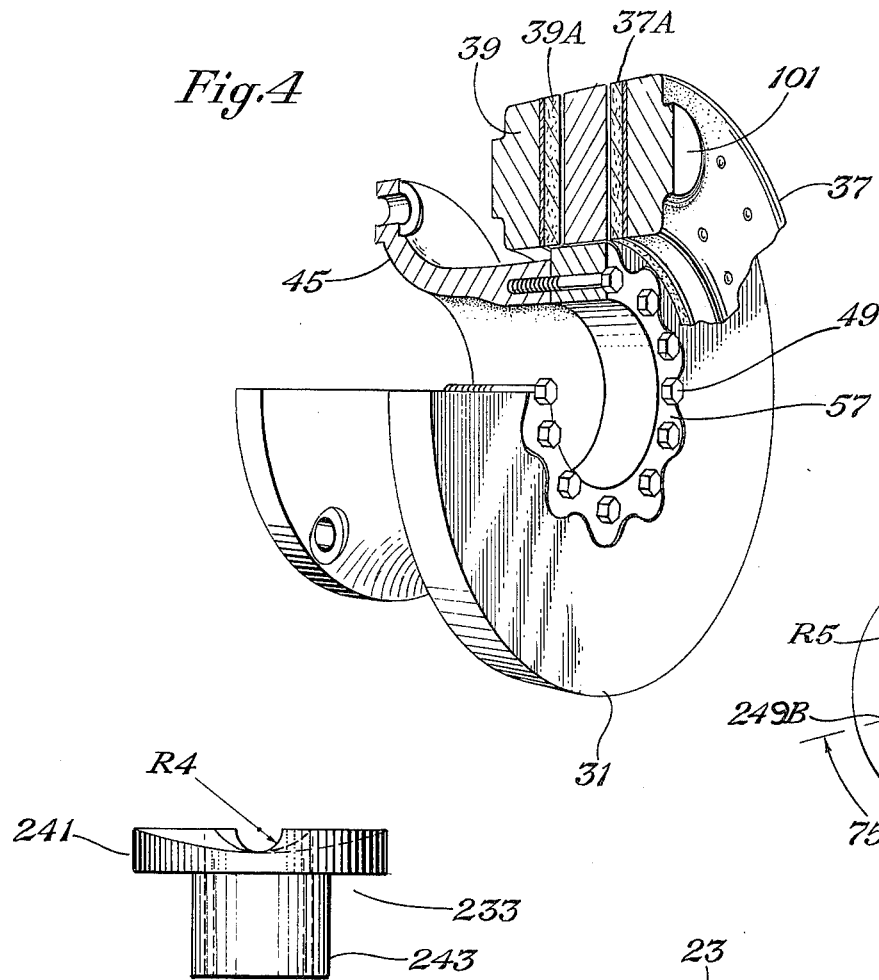
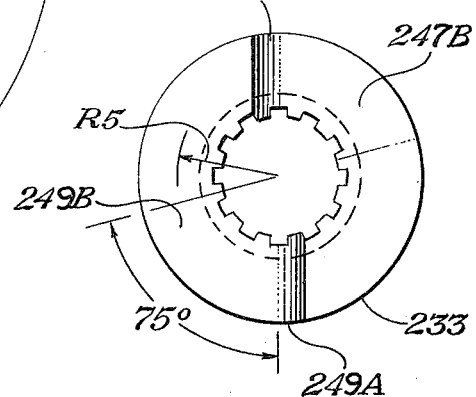
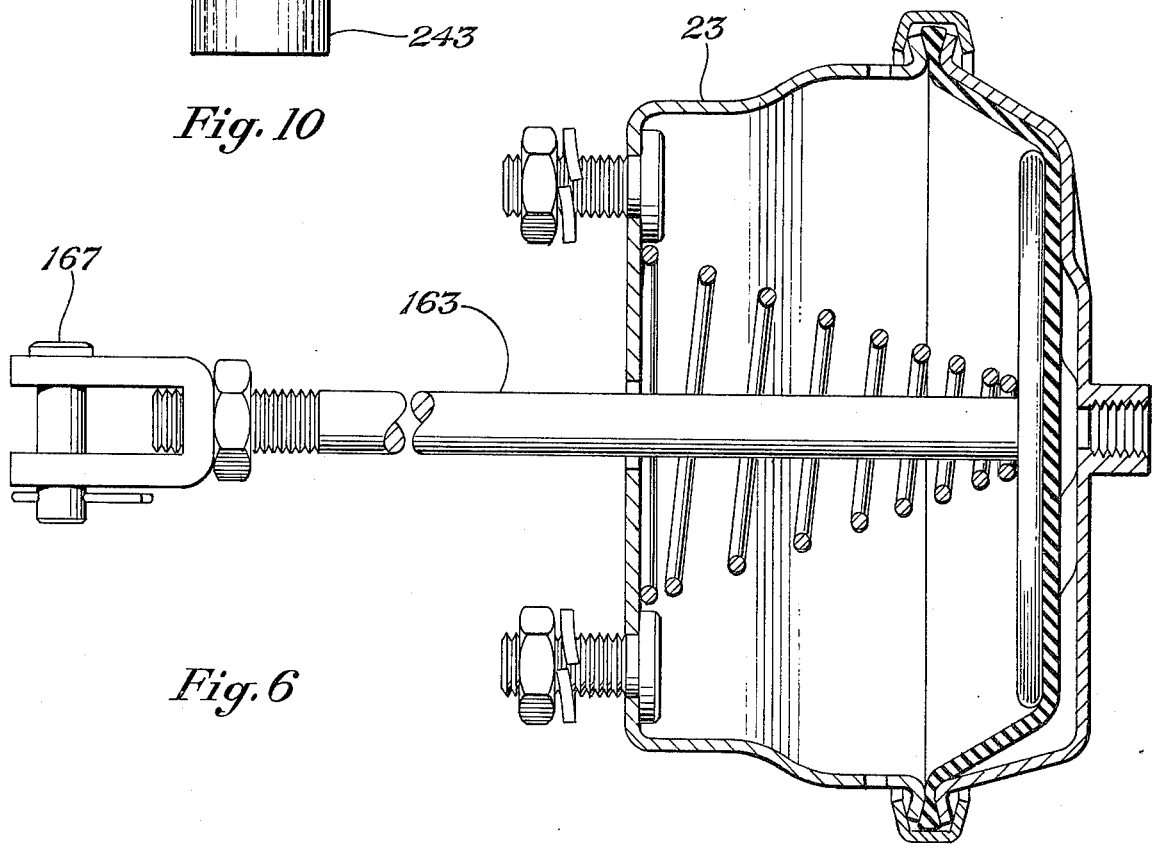

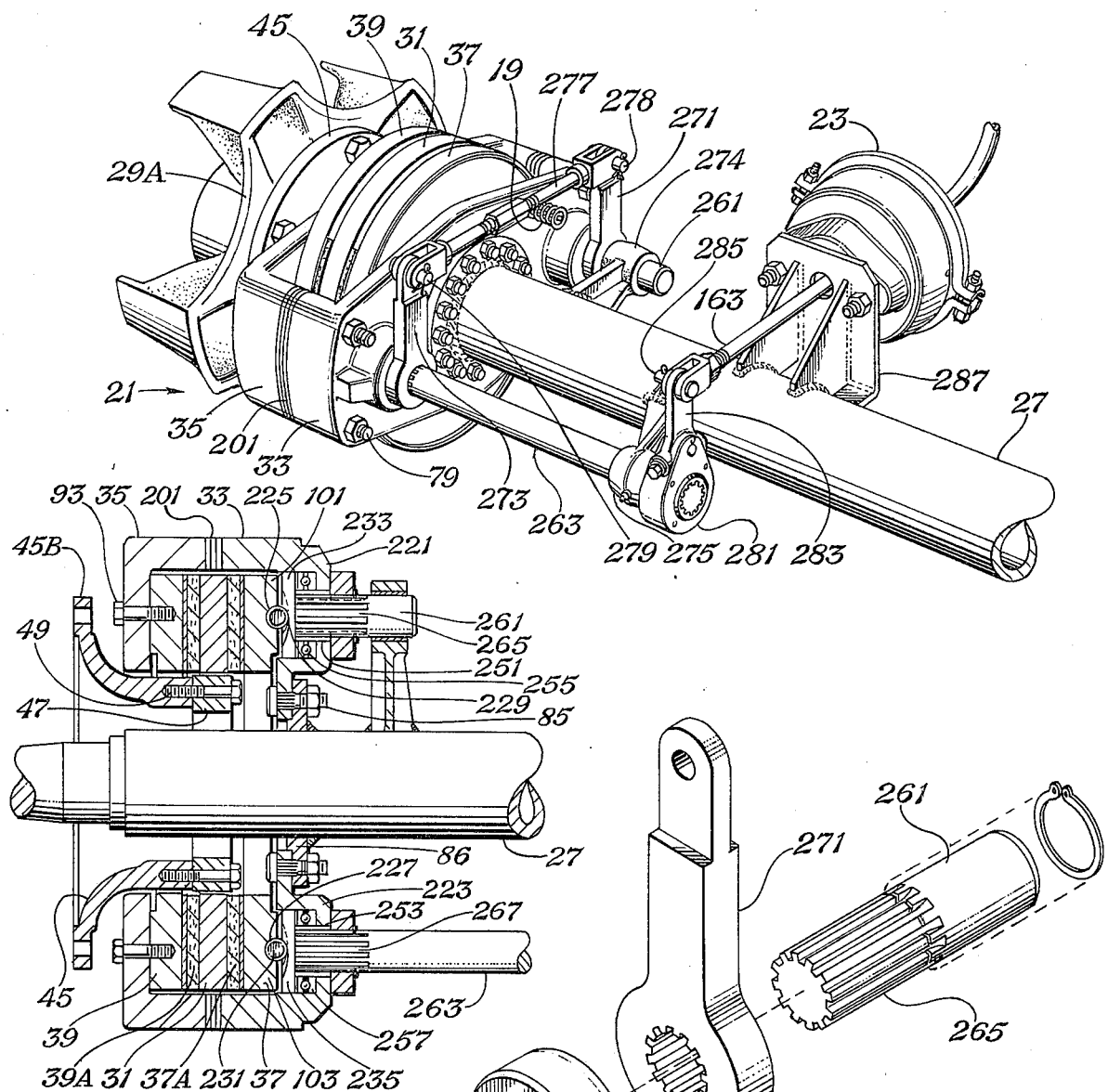
Fig. 7
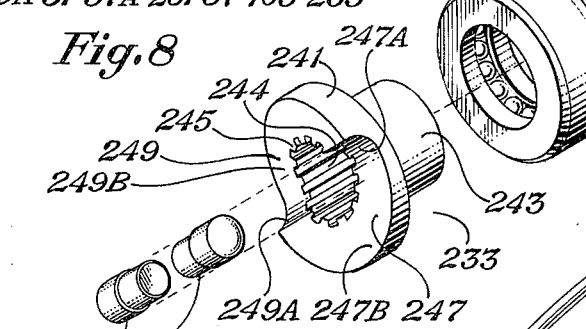
Fig. 8
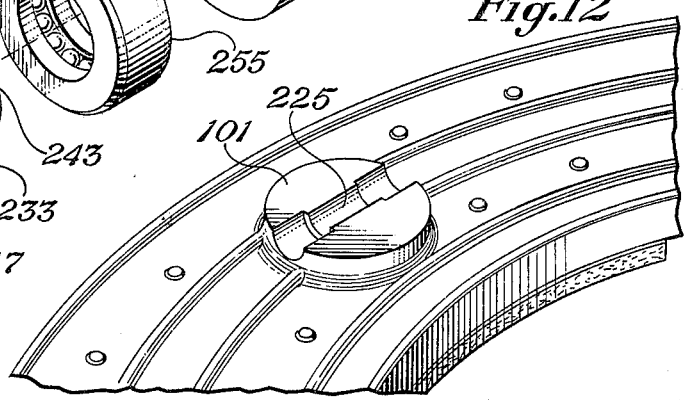
Fig. 9
Fig. 12

CAM ACTUATED DISC BRAKE ASSEMBLY

BACKGROUND OF THE INVENTION

The present invention relates to disc brakes and more particularly to pneumatically actuated disc brakes for vehicles used in the transportation industry.

Many disc brakes used on large vehicles such as tractor-trailer combinations employ two axially movable brake shoes, which are actuated hydraulically for movement against a disc rotatably coupled to a wheel of the vehicle for braking purposes. Although disc brakes of this type are is use by the transportation industry, they have disadvantages in that they are relatively complicated and require a source of hydraulic fluid and an intensifier. Moreover, the hydraulic system presents leakage and maintenance problems.

SUMMARY OF THE INVENTION

It is an object of the present invention to provide a disc brake assembly for vehicles which avoids the above problems and which provides a simple, efficient, and effective disc brake.

The disc brake assembly comprises an annular disc means adapted to be coupled to a wheel of a vehicle around the axle for rotation with the wheel and for sliding movement in a direction along the axis of the axle. A pair of frame means, each including wall means, are provided and which are adapted to have their wall means located at spaced apart positions on opposite sides of the disc means. The frame means are adapted to be connected together with one of the frame means being attached to structure of the vehicle to prevent rotation of the pair of frame means. Stationary brake lining means is coupled to one of the frame means on a side facing the disc means. An annular brake shoe is adapted to be located around the axle between the disc means and the other of the frame means and supported for axial movement toward and away from the disc means. Brake lining means is secured to said brake shoe on the side facing said disc means. Means is provided for preventing said brake shoe from rotating. In addition, actuating means is provided for moving said brake shoe toward said disc means for engaging its brake lining means with said disc means for moving said disc means toward and into engagement with said brake lining means coupled to said one frame means.

In one aspect, removable shim means are provided for spacing the pair of frame means apart and which may be removed to decrease the distance between the pair of frame means as the brake lining means wear. In the embodiment disclosed, each of the frame means has first and second ends spaced apart sufficient to be located radially outward of the disc means when the frame means are connected together in place. A plurality of threaded means are provided for removably connecting said first ends of said frame means together and said second ends of said frame means together. The shim means preferably include slots formed in their inner edges for receiving the threaded means and which may be readily removed by loosening the connection between said pair of frame means.

In a further aspect, the disc means is coupled to the wheel by way of a flange adapter which is adapted to be located around the axle of the vehicle and which has a first end adapted to be coupled to the wheel on the inner side thereof for rotation with the wheel around the axle. The annular disc means is adapted to be located around the other end of the flange adapter inward of the wheel. The flange adapter has axially disposed guide means formed around the periphery of its other end and said annular disc means has mating guide means, axially disposed and formed on its inner periphery for securing said annular disc means to said flange adapter for rotation therewith and for allowing said annular disc means to move axially on said guide means of said flange adapter. In the embodiment disclosed, said guide means formed on said flange adapter and on the inner periphery of said annular disc means are rounded in profile to provide increased strength to minimize the possibility of shearing action between the disc means and the flange adapter during operation of the disc brake.

The actuating means comprises a camming arrangement actuated by a pneumatic system for actuating the disc brake assembly for braking purposes. The camming arrangement comprises a pair of cam means having cam rise surfaces for engaging a pair of cam engaging roller means supported on the back side of the axially movable brake shoe for moving said brake shoe toward said disc means, upon movement of said pair of cam means in a given direction, for engaging said brake lining means of said brake shoe with said disc means for moving said disc means toward and into engagement with said brake lining means coupled to said one frame means.

In the preferred embodiment, the camming arrangement comprises a pair of rotary cams supported for engaging a pair of cam engaging roller means supported on the back side of said brake shoe. The pair of rotary cams are supported for rotation about axes generally parallel with the axis of said annular brake shoe. Rotating means is provided for rotating said rotary cams for moving said brake shoe toward said disc means for braking purposes. The rotating means comprises a pair of rod means extending from said pair of rotary cams respectively for rotating said cams; a pair of linkages having first ends connected to said pair of rods respectively; a linkage pivotally connected between the other ends of said pair of linkages; a rear linkage connected to the other end of one of said one rod means; and pneumatic means coupled to said rear linkage for rotating said rear linkage and hence said rotary cams for actuation purposes.

In another embodiment, said pair of camming means comprises a pair of camming levers, each associated with a roller means and supported for movement about a pivot axis. Said camming levers each have a camming surface at a first end the distance of which gradually increases from its pivot axis for engaging its associated roller means for moving said brake shoe toward said disc means upon actuation of said camming levers for braking purposes. A pair of rod means have first ends pivotally connected to the other ends of said camming levers respectively for actuation for said camming levers and a pair of pneumatic cylinders are operatively connected to the other ends of said rod means for actuation purposes.

BRIEF DESCRIPTION OF THE DRAWINGS

FIGS. 3A and 3B are exploded views of the disc brake assembly of FIG. 1;

FIG. 4 is a partial perspective cross sectional view of a portion of the disc brake assembly of FIG. 1;

FIG. 5 is a plan view of one of the camming levers employed in the disc brake assembly of FIG. 1;

FIG. 6 is a cross sectional view of one of the pneumatic cylinders employed in the disc brake assembly of FIG. 1;

FIG. 7 is a perspective view of another embodiment of the disc brake assembly of the present invention;

FIG. 8 is a partial cross sectional view of the disc brake assembly of FIG. 7;

FIG. 9 is an exploded view illustrating one of the rotary cams and linkage of the disc brake assembly of FIG. 7;

FIG. 10 is a side view of one of the rotary cams of FIG. 7;

FIG. 11 is a top plan view of the rotary cam of FIG. 10; and

FIG. 12 illustrates a portion of the back side of the brake shoe of FIGS. 7 and 8 which supports rollers for engaging one of the rotary cams of the disc brake assembly of FIG. 7.

DETAILED DESCRIPTION OF THE INVENTION

Figure 1:
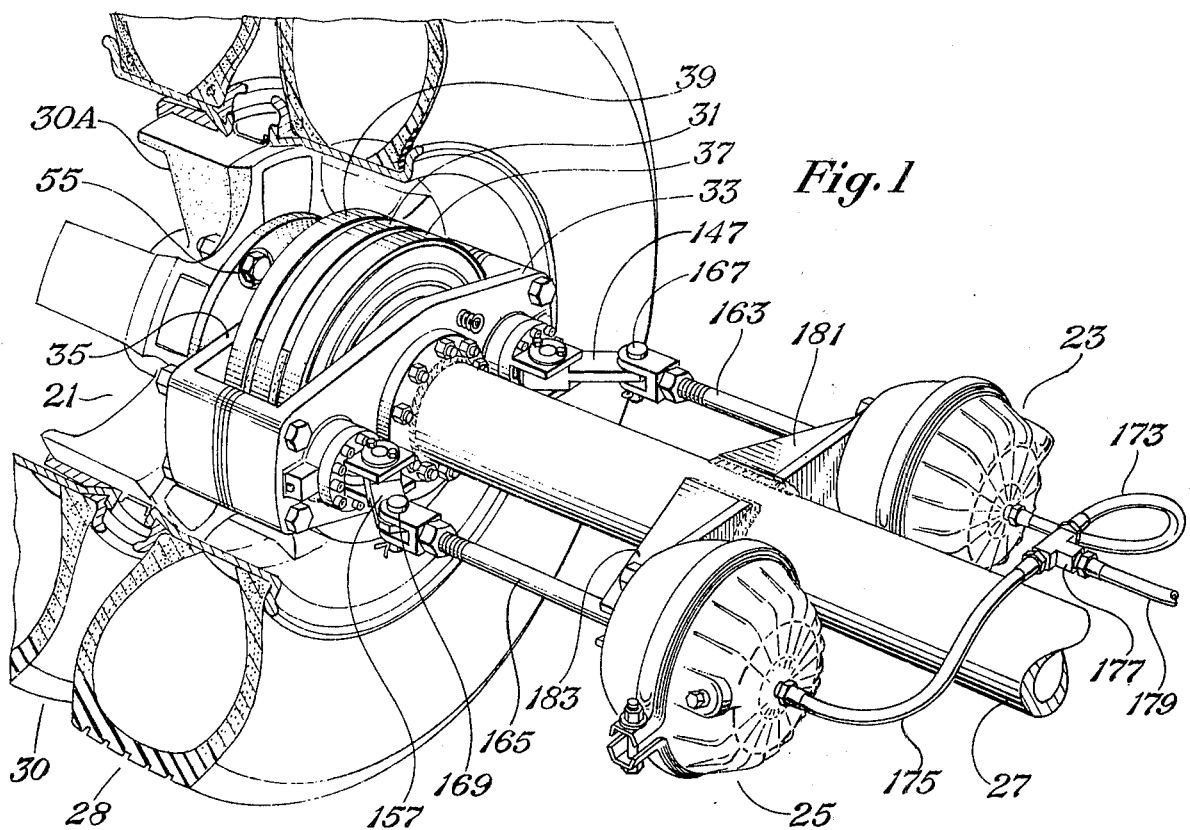
FIG. 1 is a perspective view of one embodiment of the disc brake assembly of the present invention.
Figure 2:
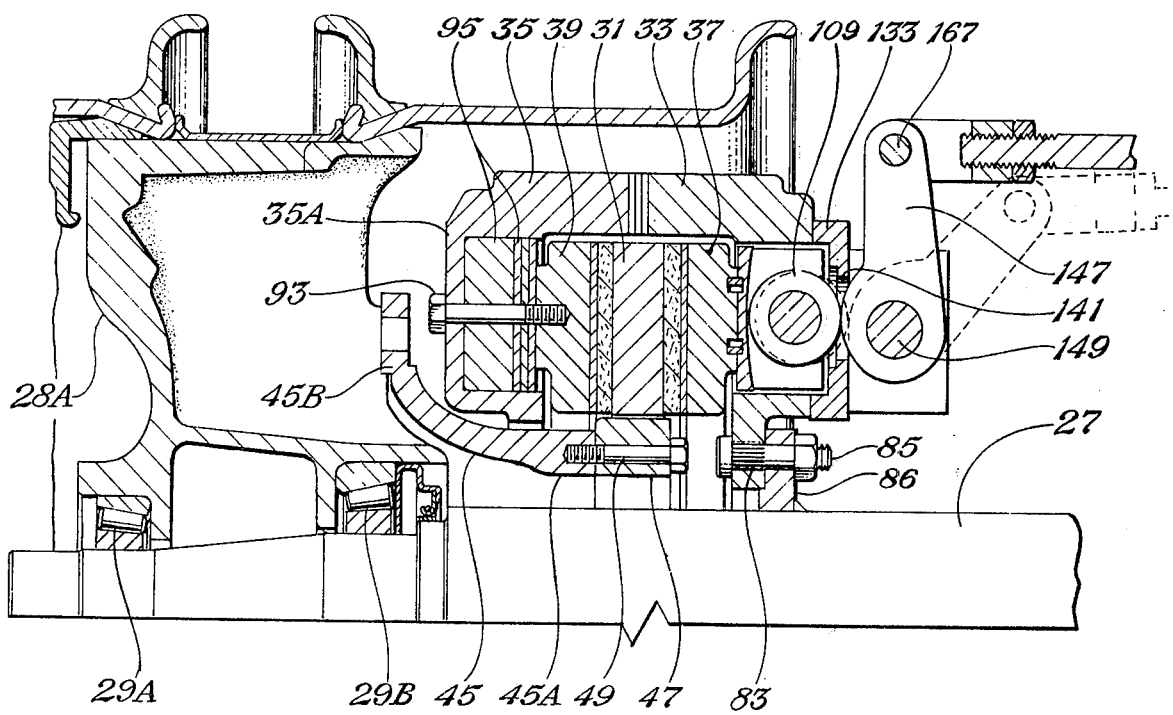
FIG. 2 is a cross sectional view of a portion of the disc brake assembly of FIG. 1.

Referring to FIGS. 1 and 2, the disc brake assembly disclosed therein is identified by reference numeral 21. It has two air cylinders 23 and 25 for actuating the disc brake for braking purposes. In use, two of these brakes will be employed on each axle of a vehicle for controlling the wheels of the vehicle. The brakes may be employed on an unpowered following axle of a trailer of a tractor/trailer combination or they may be employed on a powered axle of the tractor or truck for controlling its wheels. In FIGS. 1 and 2, the brake is shown connected to a following, unpowered axle 27 of a trailer. The hub 28A of the wheel 28 is coupled to the axle 27 by way of bearings 29A and 29B and rotates freely about the axle. The hub 30A of wheel 30 is connected to hub 28A whereby both wheels 28 and 30 rotate together.

Referring also to FIGS. 3A, 3B, and 4, the disc brake assembly comprises a steel disc 31, inner and outer housing or frame members 33 and 35 located on opposite sides of the disc 31 and brake shoes 37 and 39, also located on opposite sides of the disc 31 and between the disc and the walls of the inner and outer frame members 33 and 35. Arcuate friction or brake liners 37A and 39A are connected to the sides of the shoes 37 and 39 respectively facing the disc 31 for braking purposes. Frame members 33 and 35 are fixedly connected together and to the axle 27. Brake shoe 39 is fixedly secured to the frame member 35. The disc 31 is supported for rotation with the wheel 29 and for axial movement toward and away from shoe 39. Brake shoe 37 is supported for axial movement toward and away from the disc 31. In braking operations, the pneumatic air cylinders 23 and 25 are actuated to move the brake shoe 37 towards the disc 31 for engaging its brake linings 37A with the disc 31 for moving the disc 31 toward and into engagement with the brake lining 39A connected to stationary shoes 39 for braking purposes.

The disc 31 comprises an annular steel member having a central aperture 41 formed therethrough with axially disposed teeth 43 formed on its inner periphery defining grooves 44 between the teeth. The disc 31 is supported for rotation with the wheel 29 around the axle by way of a flange adapter 45 and guide member 47 which is connected to the inner smaller end 45A of the flange adapter by way of bolts 49. The flange adapter 45 and the guide member 47 have central apertures 51 and 53 formed therethrough respectively for receiving the axle 27. In assembly, flanged end 45B of the flange adapter 45 is connected to the hub 29A by way of bolts 55, with its smaller end 45A and guide member 47 extending inward around the axle 27. The guide member 47 has a plurality of axially disposed teeth 57 formed around its outer periphery defining grooves 58 which mate with grooves 44 and teeth 43 respectively of the disc 31 such that the disc 31 may be fitted around and supported by the guide member 47. Thus, as the wheel 29 and hence wheel 33 rotate, the flange adapter 45, guide member 47, and disc 31 rotate around the axle with the wheel. The clearance between the teeth and grooves of disc 31 and guide member 47 is such as to allow the disc 31 to slide axially on the teeth and grooves of guide member 47 for braking purposes.

The inner frame member 33 comprises an elongated wall 61 having short side walls 63 and 65 extending from its narrow ends. Formed through the wall 61 is a central aperture 67 for freely receiving the axle 27. Similarly, the outer frame member 35 comprises an elongated wall 71 having short side walls 73 and 75 extending from its narrow ends. Formed through the wall 71 is a central aperture 77 for freely receiving the smaller end 45A of the flange adapter 47 to allow rotation of the flange adapter. Frame member 33 has apertures 63A and 65A formed through its side walls while frame member 35 has apertures 73A and 75A formed through its side walls to allow the two frame members 33 and 35 to be connected together by way of bolts 79 to position their walls 61 and 71 on opposite sides of the disc 31. The inner frame member 33 has apertures 83 (see FIG. 2) formed therethrough around its central aperture 67 for receiving splined bolts 85 for connecting the inner frame member to a flange 86 welded around the axle 27. Thus, when assembled in place, frame members 33 and 35 are fixedly connected together and to the axle of the vehicle.

The brake shoes 37 and 39 are annular members having central apertures 87 and 89 formed therethrough respectively for freely receiving the axle 27 and the inner end 45A of the flange adapter 45 in the case of brake shoe 39. Shoes 37 and 39 each have a pair of friction liners 37A and 39A connected to their inner surfaces respectively for engagement with the disc 31 for braking purposes, as mentioned above. Liners 37A are connected to shoe 37 by way of flat headed rivets 91 while liners 39A are connected to shoe 39 by similar flat headed rivets 91. Shoe 39 is fixedly secured to frame member 33 by way of bolts 93. These bolts extend through cylindrical members 35A formed in the back side of the frame 35, through spacing members 95 located in the cylinders 35A and have their ends threaded to the back side of shoe 39. Shoe 37 is supported for axial movement toward and away from the disc 31. As illustrated in FIG. 3B, shoe 37 has cooling fins 97 formed on its back side for cooling purposes. In addition, it has a pair of bosses 101 and 103 formed on its back side to which are attached a pair of roller assemblies 105 and 107. As illustrated, the roller assemblies comprises rollers 109 and 111 supported for rotation between pairs of supports 113 and 115 respectively by pins 117 and 119. The supports 113 and 115 are attached to the bosses 101 and 103, for example, by bolts. Inner frame member 33 has two apertures or cylinders 121 and 123 formed therethrough for receiving the bosses 101 and 103 and roller assemblies 105 and 107, when the brake is assemblied in place. The bosses 101 and 103 slidably engage the walls of the cylinders 121 and 123 respectively and hence support the shoe 37 for axial movement and at the same time prevent the shoe 37 from rotating.

Attached to the back side of the inner frame member 37 over the apertures 121 and 123 are a pair of camming lever assemblies 129 and 131 which support two camming levers having camming surfaces for engaging the rollers 109 and 111 for braking purposes. The camming lever assemblies comprise two cup-shaped members 133 and 135 attached to the back side of the frame member 37 over the apertures 121 and 123 by way of bolts 137 and 139. Cup-shaped member 133 has an aperture 141 formed therethrough (see FIG. 2) and has attached to its back side on opposite sides of the aperture 141, a pair of supports 143 between which are pivotally connected a camming lever 147 by way of a pivot pin 149. Similarly, cup-shaped member 135 has an aperture (not shown) formed therethrough and has attached to its back side, on opposite sides of the aperture, a pair of supports 151 between which is pivotally connected a camming lever 157 by way of a pivot pin 159.

As illustrated in FIG. 5, camming lever 147 has a camming surface 161 adapted to engage roller 109. Camming surface 161 rises between points 161A and 161B relative to the pivot pin 149 such that when the lever 147 is pivoted outward from the dotted position shown in FIG. 2 to the full lined position in FIG. 2, the camming surface 161 engages and pushes against the roller 109 to move the roller 109 and hence its end of the brake shoe 37 toward the disc 31 for braking purposes. Camming lever 157 is constructed the same as lever 147 and has a camming surface (not shown) formed at one end which is adapted to engage roller 111. The camming surface of lever 157 rises relative to its pivot point 159 in a manner similar to that shown in FIG. 5 such that when the lever 157 is pivoted outward, the cam rise will engage and push against the roller 111 to move the roller 111 and hence its end of the brake shoe 37 toward the disc 31 for braking purposes. In operation, the levers 147 and 157 are actuated simultaneously for braking purposes by way of rods 163 and 165 driven by air cylinders 23 and 25 respectively. Rods 63 has its end pivotally connected to the outer end of lever 147 by way of pivot pin 167 while rod 165 has its end pivotally connected to the outer end of lever 159 by way of pivot pin 169. Chambers 23 and 25 are connected to a source of air pressure by way of air lines 173 and 175 which are connected together to the T-connection 177 and to a common air pressure line 179. Line 179 is coupled to the source of air pressure. Cylinders 23 and 25 are fixedly secured to the axle 27 by way of supports 181 and 183. Both of the cylinders 23 and 25 are alike with cylinder 23 illustrated in cross section in FIG. 6. In operation for braking purposes, air is admitted to cylinder 23 and 25 through common line 179 to move their piston rods 163 and 165 forward simultaneously. This causes the ends of the levers 147 and 157 to be moved outwardly to move their camming surfaces into engagement with the rollers 109 and 111 to move the shoe 37 toward the disc 31 to engage its linings 37A with the disc 31 and to move the disc 31 toward and into engagement with the stationary friction liners 39A of shoe 39 for braking purposes.

Normally, the brake shoe 37 and its liners 37A are biased away from the disc 31 by a pair of springs 191 which are coupled to the brake shoe 37 by way of a pair of hooks 193. The springs 191 are located on the back side of the frame member 33 and are seated in apertures 195 formed through the frame on opposite sides of the central aperture 67. The hooks 193 are connected to the backside of the brake shoe 37 and extend through apertures 195 to the back side of the housing frame 33 where they are coupled to springs 191. The hooks 193 are connected to the brake shoe 37 by inserting their hooked ends through apertures 197 formed in cooling fins 97. The opposite ends of the hooks 193 are T-shaped and extend through the springs 191 and through slots formed in caps 199 which seat against the springs 191. Thus, the springs 191 are connected to the brake shoe 37 by way of hooks 193 and normally urge the shoe 37 away from the disc 31. Upon rotation of the wheels and hence flange adapter 45 and guide 47, the disc 31 will be moved out of effective engagement with the lining 37A by the force of momentum.

A plurality of removable shims 201 are provided for adjustment purposes as the brake linings 37A and 39A wear. As illustrated in FIGS. 1, 2, 3A and 3B, three shims 201 will be located between the ends of frame member walls 63 and 73 and between frame member walls 65 and 75. These shims space the frame members apart at a distance sufficient to allow effective engagement of the brake linings 37A and 39A with the disc as the camming levers 147 and 157 are actuated for braking purposes. As the brake linings wear, a shim 201 will be removed from each end of the frame members 33 and 35 to compensate for wear of the brake linings to allow effective engagement of the brake linings with the disc for braking purposes. Although only three shims are illustrated as being located between the opposite ends of the frame members 33 and 35, it is to be understood that more shims could be employed for example, up to six shims initially. The shims are formed of metal and have a thickness of 0.062 of an inch. As illustrated in FIGS. 3A and 3B, each shim is arcuate in shape and has two slots 203 formed in its inner edge 205 for receiving the bolts 79 connecting the two frame members 33 and 35 together. When it is desired to remove a pair of shims, the bolts 79 are loosened and the shims 201 are slipped outward thereby facilitating removal without disassembly of the disc brake.

In one embodiment, two of the disc brake assemblies of FIGS. 1–6 are adapted for use on a 20,000 pound rated axle. The disc 31 is formed of steel and has an outside diameter of about 15 inches and a thickness of about 1 inch. The brake shoe 37 and 39 are formed of cast iron and have outside diameters also of about 15 inches. The guide member 47 has a thickness of 1-½ inches. It has 10 teeth as does the disc 31. The teeth 43 and 57 are involute in profile and have rounded ends while the grooves 44 and 58 have rounded bottoms to provide a wider base for the teeth and hence more strength to prevent shearing. The major inside diameter D1 of the disc 31 is equal to 7.930 inches while the minor inside diameter D2 is equal to 7.120 inches. The angle $\theta$ is equal to 36° while the radius of curvature R1 is equal to 0.875 of an inch. In another embodiment, the guide member 47 and disc 31 may have 8 teeth and grooves respectively instead of 10. In this embodiment, D1 is equal to 7.930 inches, D2 is equal to 7.10 inches. R1 is equal to 0.875 of an inch and $\theta$ is equal to 45°.

The air cylinders 23 and 25 each is identified as a size 36 cylinder having a 3 inch stroke which is accepted by the industry. For each psi of force applied to its input, each cylinder provides an output of 36 psi of force. The cylinders are operated by air pressure derived from a compressor operated reservoir on the trailer/tractor combination. Lever 147 has apertures 149A and 167A for receiving pivot pins 149 and 167 respectively while lever 157 has apertures 157A (not shown) and 169A for receiving pivot pins 157 and 169 respectively. The distance L1 of the levers 147 and 157 between the centers of their pivot pin receiving apertures 149A, 167A and 159A, 169A is equal to 3.5 inches. L2 is equal to 1.312 inches; L3 is equal to 0.375 of an inch; L4 is equal to 0.875 of an inch; R2 is equal to 1.312 inches; R3 is equal to 0.937 of an inch and $\phi$ is equal to 45°. The camming surface 161 between points 161A and 161B rises at a rate of 0.017 of an inch per 0.100 of an inch in travel of the lever. The distance L1 plus the cam rise from 161A to 161B results in a mechanical advantage of 9.2 for each lever. Thus, for the specifications given, the total force in pounds produced by the brake against the disc for braking purposes can be calculated to be equal to about 108,437 pounds for an air pressure of 80 psi applied to cylinders 23 and 25. In a dynamometer test employing 80 psi of air pressure, the torque produced by the brake against the disc 31 has been measured to be equal to about 119,000 inch-pounds which surpasses the federal regulations of 110,000 inch-pounds. As now can be understood, by employing the cam levers 147 and 157 having the cam rise mentioned above for actuating the shoe 37, a large amount of braking force can be obtained even though the air cylinders 23 and 25 each have a stroke of only about 3 inches.

Although the brake linings 39A were disclosed as being coupled to the housing 35 by way of brake shoe 39, the brake shoe 39 may be eliminated and the brake lining 39A attached directly to the inner side of the housing 35. This arrangement has advantages in that it will result in a reduction in thickness and weight of the disc brake, however, it may not provide the same amount of stability on larger brakes which would result by the use of brake shoe 39 attached to the housing 35, with the brake linings 39A attached to the shoe 39, as described previously.

Although the guide member 47 was described as a separate member which was attached to the end 45B of the flange by way of bolts 49, the guide member 47 may be formed with the flange adapter 45, as an integral part of the flange adapter.

Referring now to FIGS. 7–12, there will be described another embodiment of the disc brake assembly 21. This disc brake assembly is similar to that of FIGS. 1–6, except that it employs two rotary cams and a single air chamber for actuating the brake for braking purposes. In FIGS. 7–12, like components are identified by the same reference numerals as those employed in FIGS. 1–6. In this respect, the disc brake assembly of FIGS. 7–12, comprises a steel disc 31, inner and outer housing of frame members 33 and 35 located on opposite sides of the disc 31, and brake shoes 37 and 39 also located on opposite sides of the disc 31 and between the disc 31 and the inner and outer walls of the frame members 33 and 35 respectively. A pair of friction liners 37A and 39A are connected to the sides of the shoes 37 and 39 respectively facing the disc 31 for braking purposes. Frame members 33 and 35 are connected together by way of bolts 79 with frame member 33 being connected to the axle by way of bolts 85 and flange 86 welded around the axle 27. Brake shoe 39 is fixedly secured to the frame member 33 by way of bolts 93. The disc 31 includes the teeth 43 and grooves 44 and is supported for rotation with the wheel 29 and for axial movement toward and away from the brake shoe 39 by way of flange adapter 45 and guide member 47 which has the axially disposed grooves 58 and teeth 57 which mate with the teeth 43 and grooves 44 of the disc 31. Shoe 35 is supported for axial movement toward and away from the disc 31 for braking purposes. Normally, the shoe 31 and its brake lining is biased away from the disc 31 by way of the springs 191 and hooks 193 as described previously.

The back side of the shoe 37 has two projecting bosses 101 and 103 extending therefrom and which are slidably supported in the cylinders 221 and 223 projecting from the back side of the frame 33. Bosses 101 and 103 have grooves 225 and 227 formed therein respectively for supporting a pair of rollers 229 and 231. In FIG. 12, the groove 225 of boss 101 is illustrated in more detail while FIG. 9 illustrates the pair of rollers 229 adapted to fit into groove 225. Groove 227 of boss 103 is the same as groove 225 while the pair of rollers 231 are the same as the pair of rollers 229. Rotatably supported in cylinders 221 and 223 are rotary cams 233 and 235 having camming surfaces adapted to engage the pair of rollers 229 and the pair of rollers 231 respectively. The rotary cams 233 and 235 are identical to each other and reference may be had to FIGS. 9–11 for a description of the rotary cam 233. As illustrated, cam 233 is T-shaped in cross section and comprises an annular cam head 241 having a smaller annular shaft 243 integral therewith and extending from the back side. Aperture 244 extends through the head 241 and shaft 243 and has splines 245 formed on its inner periphery. The front face of the head 241 has two cam surfaces 247 and 249 for separate engagement with the two rollers of the roller pair 229. Similarly, the front face of the head of cam 235 has two cam surfaces for separate engagement with the two rollers of the roller pair 231. The shafts of the two cams 233 and 235 extend into openings 251 and 253 formed through the back side of the cylinders 221 and 223 respectively. Located around the annular shafts of the rotary cams between their cam heads and the back wall of the cylinders 221 and 223 are bearings 255 and 257 respectively. Rods 261 and 263 have splines 265 and 267 at their ends which are fitted into and locked to the splines of the rotary cams 233 and 235 respectively. Also splined to the rods 261 and 263 on the back side of the cylinders 221 and 223 are linkages 271 and 273. Rod 261 is supported for rotation by way of support structure 274 fixedly secured to the shaft 27. Rod 263 is much longer than rod 261 and is supported for rotation by way of structure 275 also fixedly secured to the axle 27. A linkage 277 has its opposite ends pivotally connected to the outer ends of the linkages 271 and 273 by way of pivot pins 278 and 279. The rear end of the rod 263 has a slack adjuster 281 splined thereto and which includes a linkage 283 pivotally connected to the end of the rod 163 of air cylinder 23. The pivotal connection is by way of a pin 285. The cylinder 23 is fixedly secured to the axle 27 by support structure 287.

As illustrated, the camming surfaces 247 and 249 of cam 233 each include first portions 247A and 249A which extend steeply inward from the front face of the cam head and second cam rise portions 247B and 249B which gradually rise from the low point to the front face of the cam head. The cam rise portions 247B and 249B rise in opposite directions with respect to each other such that when the rotary cam 233 is rotated in the proper direction, the cam rise surfaces engage the pair of rollers 229 and force the associated end of the shoe 37 towards the disc 31 for braking purposes. In this action, the two rollers of the pair 229 rotate in opposite directions. Rotary cam 235 is identical with the rotary cam 233 and operates in the same manner when rotated in the same direction for engaging its cam rise surfaces with the rollers 231 for forcing the other end of the shoe 39 toward the disc 31.

Since the rotary cams 233 and 235 are connected together by way of rods 261 and 263, linkages 271 and 273 and linkage 275, the cams will be rotated simultaneously together in the same direction by rotation of the rod 263. This rod is rotated for braking purposes by pressurizing cylinder 23 which moves its piston rod 163 outward and hence rotates the rod 263 by way of the slack adjuster 281 and linkage 283. Thus, in operation, when the cylinder 23 is pressurized, the rotary cams are rotated in the same direction to apply force to the roller pairs 229 and 231 and hence to the shoe 37 to move the shoe 37 towards the disc 31 for engaging its linings 37A with the disc 31 thereby moving the disc 31 toward and into engagement with the brake linings 39A for braking purposes.

In the embodiment disclosed, the cam rise surfaces 247B anad 249B each extend over an arc of 75°, as illustrated in FIG. 11. The radius R4 is equal to 0.375 of an inch and the rise of each surface 247B and 249B is constant at 0.005 of an inch per one degree of rotation. This rate of cam rise is calculated per degree of travel of the cam from the center point of rod 263 to the center of the annulus of the cam head 241 between the inside and outside diameters of the cam head. This radius is equal to 1.25 inches. The distance from the center of rod 263 to the center of pivot pin 285 is equal to 6 inches. Thus, the mechanical advantage of going from the air cylinder through the rotary cam is equal to 4.8 while the ratio of the cam rise to travel of the cam is equal to 0.655/0.166 or 3.94. 3.94. For a size 36 air chamber having a stroke of three inches and with an air pressure of 80 psi, the force applied by the brake for stopping the disc 31 can be calculated to be equal to 105,984 pounds of force. Thus, the embodiment of FIGS. 7–12 employs a single air chamber yet produces nearly the same amount of force as the dual air chamber brake assembly of FIGS. 1–6. Hence, as can be understood, the brake assembly of FIGS. 7–12 has advantages in that it requires much less air for operation, leaving more air in the tractor/trailer combination reservoir, thereby allowing the tractor/trailer combination to more readily meet the new federal government standards of 2,800 cubic inches of air available in the reservoir for operating the tractor/trailer combination. This new standard is twice the old standard of 1,400 cubic inches. As can also be understood, the embodiment of FIGS. 7–12 also have advantages in that it requires less components than the embodiment of FIGS. 1–6. Moreover, by employing the cam rise surfaces as mentioned and the mechanical advantages of the linkages described, a large amount of force can be obtained with the conventional air cylinder having a stroke of only three inches.

As in the embodiment of FIGS. 1–6, the brake assembly of FIGS. 7–12 may have the brake linings 39A attached directly to the inside of the housing frame 35 thereby eliminating the brake shoe 39, resulting in a reduction of thickness and weight. In addition, the disc guide 47 may be formed as an integral part of the end of the flange adapter 45, as described previously. Each of the rollers of the roller pairs 229 and 231 has a maximum diameter of 0.750 of an inch.

Although the disc brakes disclosed employ a pneumatic system for actuation, it is to be understood that certain features of the disc brakes may be employed in disc brakes actuated by a hydraulic system. For example, a hydraulically actuated brake may comprise the same structure as disclosed in FIG. 1, except that a pair of hydraulically actuated pistons may be supported by the inner frame member 33 for engaging the back side of the brake shoe 37 for moving the brake shoe 37 and its linings 37A into engagement with disc 31 for moving the disc 31 into engagement with brake linings 39A for braking purposes.

I claim:
1. A disc brake assembly for a wheel of a vehicle comprising:
   an annular disc means adapted to be coupled to a wheel around the axle of the vehicle for rotation with the wheel and for sliding movement in a direction along the axis of the axle,
   frame means adapted to be fixedly secured to the vehicle and including a pair of wall means adapted to be located on opposite sides of said disc means,
   brake lining means coupled to one of said wall means on a side facing said disc means,
   an annular brake shoe adapted to be located around the axle between said disc means and the other of said wall means and supported for axial movement toward and away from said disc means,
   brake lining means secured to said brake shoe on the side facing said disc means,
   means for preventing said brake shoe from rotating,
   said brake shoe having a pair of cam engaging means located on its side opposite said disc means,
   a pair of rotary cams supported for engaging said pair of cam engaging means respectively for moving said brake shoe toward said disc means upon rotation of said rotary cam in a given direction for engaging said brake lining means of said brake shoe with said disc means for moving said disc means toward and into engagement with said brake lining means coupled to said one wall means for braking purposes,
   said pair of rotary cams being supported for rotation about axes generally parallel with the axis of said annular brake shoe,
   a pair or rod means extending from said pair of rotary cams respectively for rotating said cams,
   a pair of linkages having first ends fixedly connected to said pair of rod means respectively,
   a linkage pivotally connected between the other ends of said pair of linkages,
   a rear linkage connected to the other end of one of said rod means, and
   pneumatic cylinder means comprising piston rod means pivotally coupled to said rear linkage for rotating said rear linkage and hence said rotary cams in said given direction, each rotary cam comprises an annular means having a face with two camming surfaces formed at opposite ends thereof, each camming surface comprising a first portion which extends steeply inward from the front of said face and a second portion which extends gradually outward from said first portion to the front of said face, said second portions of said two camming surfaces being formed to extend gradually outward in opposite directions with respect to each other, said cam engaging means of each pair comprising a pair of separate roller means supported for rotation by said brake shoe and adapted to engage said two camming surfaces respectively of each rotary cam.

2. A disc brake assembly for a wheel of a vehicle comprising:

an annular disc means adapted to be coupled to a wheel around the axle of the vehicle for rotation with the wheel and for sliding movement in a direction along the axis of the axle, frame means adapted to be fixedly secured to the vehicle and including a pair of wall means adapted to be located on opposite sides of said disc means, brake lining means coupled to one of said wall means on a side facing said disc means, an annular brake shoe adapted to be located around the axle between said disc means and the other of said wall means and supported for axial movement toward and away from said disc means, brake lining means secured to said brake shoe on the side facing said disc means, means for preventing said brake shoe from rotating, said brake shoe having a pair of cam engaging roller means located on its side opposite said disc means, a pair of rotary cams supported for engaging said pair of cam engaging roller means respectively for moving said brake shoe toward said disc means upon rotation of said rotary cam in a given direction for engaging said brake lining means of said brake shoe with said disc means for moving said disc means toward and into engagement with said brake lining means coupled to said one wall means for braking purposes, said pair of rotary cams being supported for rotation about axes generally parallel with the axis of said annular brake shoe, a pair of rod means extending from said pair of rotary cams respectively for rotating said rotary cams, a pair of linkage means having first ends fixedly connected to said pair of rod means respectively, a linkage pivotally connected between the other ends of said pair of linkage means, a rear linkage connected to one of said rod means, fluid pressure means comprising piston rod means pivotally coupled to said rear linkage for rotating said rear linkage and hence said rotary cams in said given direction, each of said cam engaging roller means and its associated rotary cam being located between their associated linkage means and said brake shoe, and means for preventing each of said linkage means and its associated rod means for moving toward said brake shoe.

3. The brake assembly of claim 2 wherein:

the other of said wall means has a pair of apertures formed through portions thereof through which said pair of rod means extend, said pair of cam engaging roller means and said pair of rotary cams being located on the side of the other of said wall means which faces said brake shoe, said pair of linkage means being located on the opposite side of the other of said wall means whereby said portions of the other said wall means prevent said pair of linkage means and hence said pair of rod means from moving toward said brake shoe.

* * * * *